Jan. 7, 1958     C. K. JUDD, JR     2,818,642
PAINT SCRAPER
Filed Jan. 3, 1956
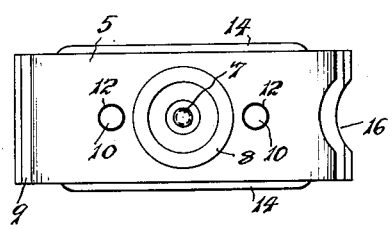
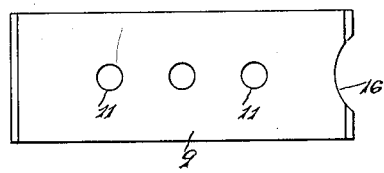
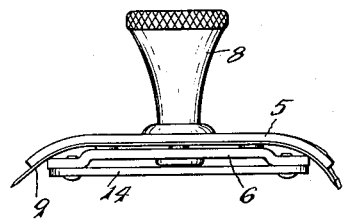
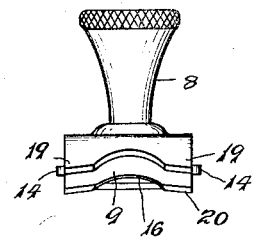
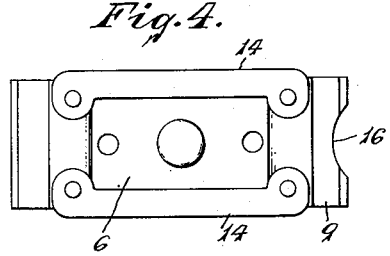
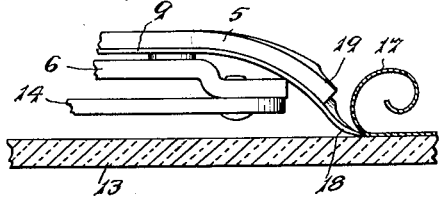
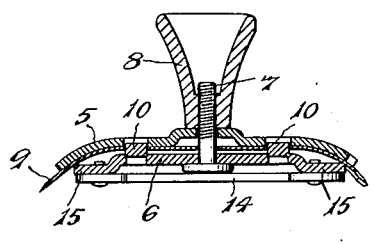
INVENTOR.
CHESTER K. JUDD JR.
BY Louis V. Lucia
ATTORNEY.

United States Patent Office 2,818,642
Patented Jan. 7, 1958

2,818,642
PAINT SCRAPER

Chester K. Judd, Jr., Bristol, Conn., assignor to The Fletcher-Terry Company, Forestville, Conn., a corporation of Connecticut Application January 3, 1956, Serial No. 556,859

1 Claim. (Cl. 30—169)

This invention relates to a paint scraper and more particularly to a scraper which is primarily intended for scraping paint from the surface of glass panes along the edges of a sash.

An object of this invention is to provide a paint scraper which will greatly facilitate the operation of scraping paint from windows.

A further object is the provision of such a device having means for guiding a scraper blade along the edge of a sash or the like without marring the surface thereof.

A still further object is the provision of improved guide means for such scrapers.

A further object is to cause the scraper blade to lift the paint off the surface of the glass rather than to push it along the said surface.

Further objects and advantages of this invention will be more clearly understood from the following description and the accompanying drawings in which:

Fig. 1 is a plan view of a scraper embodying the present invention.

Fig. 2 is a side view of said scraper.

Fig. 3 is an end view thereof.

Fig. 4 is a bottom view of said scraper.

Fig. 5 is a side view of the scraper in central vertical section.

Fig. 6 is a plan view of the scraper blade.

Fig. 7 is an enlarged side view of a portion of the scraper, illustrating its operation.

As shown in the drawings, my improved scraper includes upper and lower clamping plates 5 and 6, respectively; the lower clamping plate having thereon a clamping screw 7 which extends upwardly therefrom through an opening in the upper clamping plate and may be threaded to a handle 8 so as to draw the upper clamping plate towards the lower plate and thereby clamp a scraper blade 9 between said plates. The lower plate may also be provided with lugs 10—10 which extend upwardly therefrom and through spaced holes 11—11 in the scraper blade so as to prevent rotational movement of said blade about the screw 7. The said lugs extend through the holes 12—12 which are aligned therewith in the upper plate.

It will be noted that, when the clamping plates are in the position illustrated in Fig. 5, the ends of the scraper blade are diverted downwardly over the opposite ends of the lower plate so that the scraping edges of said blade will contact the surface of a pane of glass, indicated at 13, while the bottom of the scraper is spaced from the said surface, as clearly illustrated in Fig. 7. A pair of skid members 14—14 are mounted upon the opposite sides of the bottom plate and extend laterally therefrom so as to contact the edge of the sash and guide the scraper along the said sash while preventing the blade from contact with the sash. The said skids are preferably constructed of a suitable plastic material, such as nylon or the like, which will resist abrasion and prevent scratching of a surface contacted thereby. As shown in Fig. 4, the said skids are preferably secured at their opposite ends to downwardly bent end portions 15 of the lower clamping plate 6, the said portions being disposed parallel to but on a plane spaced from the surface of said pane.

It will be noted that the scraper blade 9 is provided with scraping edges at its opposite ends. One of said edges is preferably notched, as at 16, so as to eliminate the central portion of the scraping edge and thereby reduce the amount of pressure required to flex the end of the blade and cause it to plow under the paint 17 as illustrated in Fig. 7. It will be seen from said figure that pressure upon the scraper will flex the short end portions of the blade, indicated at 18—18 forwardly and downwardly so that they are disposed close to the surface of the glass pane 13 and thereby plow under the paint and cause it to be lifted from the surface and curled as it is scraped off. Also, the flexing of the end portions 18 as above described will operate to slice off, rather than tear, the portion of the paint which is to be removed and thereby leave a clean edge to the paint remaining on the surface.

It will also be noted, particularly from Fig. 3, that the upper clamping plate 5 is curved downwardly at its corner portions 19—19 so that it will also curve downwardly the corner portions 20—20 of the blade and thereby cause the extreme corners of said portions to contact the surface of the glass first and thus further reduce the amount of pressure necessary to force the said corner portions against the glass and flex them so that they will retain firm contact with the surface as they plow under the paint which is to be removed.

I claim:

A paint scraper including an upper clamping plate, a lower clamping plate, said upper clamping plate having a free end portion extending over a respective end portion of the lower clamping plate, a scraper blade between said clamping plates, an end portion of said blade being deflected downwardly over the end of the lower clamping plate by the respective end portion of the upper clamping plate and extending to a plane below the bottom of the lower clamping plate, the said free end portion of the upper clamping plate having its corner portions curved downwardly whereby the respective free end portion of said scraper blade is curved to dispose the opposite corners thereof below the intermediate free end portion of said blade and thereby cause said corners to contact a surface to be scraped and to flex before the intermediate portion comes into contact with the said surface, and a pair of skid members secured to the bottom of the lower clamping plate and having elongated free edge portions disposed along and spaced from the opposite sides of the said scraper.

References Cited in the file of this patent

UNITED STATES PATENTS

| | | |
|---|---|---|
| 715,107 | Melvin | Dec. 2, 1902 |
| 892,052 | Hildreth | June 30, 1908 |
| 1,018,844 | Meyer | Feb. 27, 1912 |
| 1,068,731 | Blum | July 29, 1913 |
| 1,473,546 | Eiermann | Nov. 6, 1923 |
| 1,978,091 | Kundebagian | Oct. 23, 1934 |
| 2,084,589 | Odgers | June 22, 1937 |
| 2,333,878 | Nelson | Nov. 9, 1943 |